(12) United States Patent
Perron

(10) Patent No.: US 8,849,741 B2
(45) Date of Patent: Sep. 30, 2014

(54) NOGOOD GENERATION BASED ON SEARCH TREE DEPTH

(75) Inventor: Laurent Perron, Vitry sur Seine (FR)

(73) Assignee: Google Inc., Mountain View, CA (US)

( * ) Notice: Subject to any disclaimer, the term of this patent is extended or adjusted under 35 U.S.C. 154(b) by 339 days.

(21) Appl. No.: 13/358,335

(22) Filed: Jan. 25, 2012

(65) Prior Publication Data

US 2013/0191317 A1     Jul. 25, 2013

(51) Int. Cl.
  *G06N 5/02*       (2006.01)
  *G06Q 10/06*      (2012.01)
(52) U.S. Cl.
  CPC ................................ *G06N 5/022* (2013.01); *G06Q 10/06316* (2013.01)
  USPC ......................................................... 706/50
(58) Field of Classification Search
  CPC ............ G06N 5/022; G06Q 10/06313; G06Q 10/06316
  See application file for complete search history.

(56) References Cited

PUBLICATIONS

Katsirelos et al. "Unrestricted Nogood Recording in CSP search", In Principles and Practice of Constraint Programming, 2003, pp. 1-15.*

\* cited by examiner

*Primary Examiner* — Li-Wu Chang
(74) *Attorney, Agent, or Firm* — Fish & Richardson P.C.

(57) ABSTRACT

A constraint satisfaction problem (CSP) is used to model a real-world problem in an application domain. The CSP includes a plurality of variables, a plurality of states, and one or more constraints determining which states each variable is permitted to be assigned to in a solution to the CSP. A binary tree is created using the CSP. The binary tree is iteratively searched to determine an efficient solution to the CSP. A new iteration of the search of the binary tree is started when a search depth is less than a restart depth. The restart depth based on a deepest depth previously searched minus a restart value. When the search is restarted, a NoGood marker is created indicating a portion of the binary tree that is not to be searched in the new iteration of the search. An efficient solution to the CSP is reported.

22 Claims, 6 Drawing Sheets

NOGOOD GENERATION BASED ON SEARCH TREE DEPTH

BACKGROUND

1. Field of Disclosure

The disclosure generally relates to operations research and particularly to constraint programming.

2. Description of the Related Art

There exist a number of different real world problems where although there are a large number of possible solutions to the problems, some solutions are more efficient than others. A quintessential example of such a problem is known as the travelling salesman problem, where given a list of cities and their pairwise distances, the task is to find a solution that visits each city exactly once. There are often many possible solutions, although some are better than others. There may be a single best solution that is difficult to find. The feasibility of a course of action may depend whether a sufficiently efficient solution to the problem can be found. Continuing with the travelling salesman example, if a given sales area is expected to produce a particular return for a business because of the salesman's presence, a sufficiently efficient solution may justify hiring a salesman to service the sales area versus not hiring the salesman due to the associated costs of travel and salary. Thus, there is a real world impact that is derived from being able to find solutions to these kinds of problems.

One particular way of solving such problems is couch the problem as a constraint satisfaction problem (CSP). In a CSP, a number of variables of the problem are each assigned to a specific state, subject to a set of constraints that limit how variables may be assigned to states. The assignment of all variables to states represents a solution to the CSP. Each solution will have a cost associated with the assignment of each variable to a state. In each solution, at least one of the variables is assigned a different state relative to the assigned states of the variables from every other solution. Again using the travelling salesman example, an example of a constraint is the requirement that the salesman visit each city exactly once. An example of a variable is the order in which a given city is visited. Depending upon whether a given city is visited first or last, the total cost for the salesman may vary. In this example, the cost is the total distance travelled by the salesman. For example, if the salesman were always to travel to the city furthest from his current location, the cost of travel might be higher than if the salesman always traveled to the closest city to their current location.

CSPs sidestep the complex task of trying to come up with one optimal solution by instead searching through a number of the possible solutions by assigning variables to states and determining the costs associated with the solutions. One mechanism to do this is to construct a binary tree representing all of the possible assignments of variables to states, and consequently all of the possible solutions and their associated costs. By searching the tree from top to bottom, solutions can be associated with costs and the assignments of variables to states that make up the solution can be determined.

Often, however, constraint satisfaction problems are very complex, involving large numbers of variables with a variety of possible constraints, creating a large number of possible solutions. Searching binary trees constructed according to the variables and constraints can take a great deal of time. Further, while exploring portions of a binary tree, it possible to waste searching time on a portion of the tree that has already been searched.

SUMMARY

This above and other issues are addressed by a system, method, and computer-readable medium storing executable computer program code for determining an efficient solution to a constraint satisfaction problem (CSP). Embodiments of the system and computer-readable medium include a non-transitory computer-readable storage medium storing executable computer program instructions. The instructions are executable to initialize the CSP and construct a binary tree using the CSP. The CSP models a real world problem in an application domain. The CSP comprises a plurality of variables, a plurality of states, and one or more constraints determining which states each variable is permitted to be assigned to in a CSP solution. A CSP solution models a real world solution to the real world problem. The instructions are further executable to iteratively search the binary tree to determine an efficient solution to the CSP. The searching comprises starting a new iteration of the search of the binary tree when a search depth is less than a restart depth. The restart depth is based on a deepest depth previously searched minus a restart value. The instructions are further executable to report the efficient solution. An embodiment of the system also includes a processor for executing the computer program instructions.

An embodiment of the method comprises receiving a CSP input, the CSP input describing a real world problem in an application domain. The CSP input comprises a plurality of variables, a plurality of states, and one or more constraints determining which states each variable is permitted to be assigned to in a CSP solution. The CSP solution models a real world solution to the real world problem. The method further comprises initializing the CSP using the CSP input, the initializing comprising constructing a binary tree using the CSP input. The method additionally comprises searching, iteratively, the binary tree to determine an efficient solution to the CSP, the searching comprising starting a new iteration of the search of the binary tree when a search depth is less than a restart depth, the restart depth based on a deepest depth previously searched minus a restart value and reporting the efficient solution.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
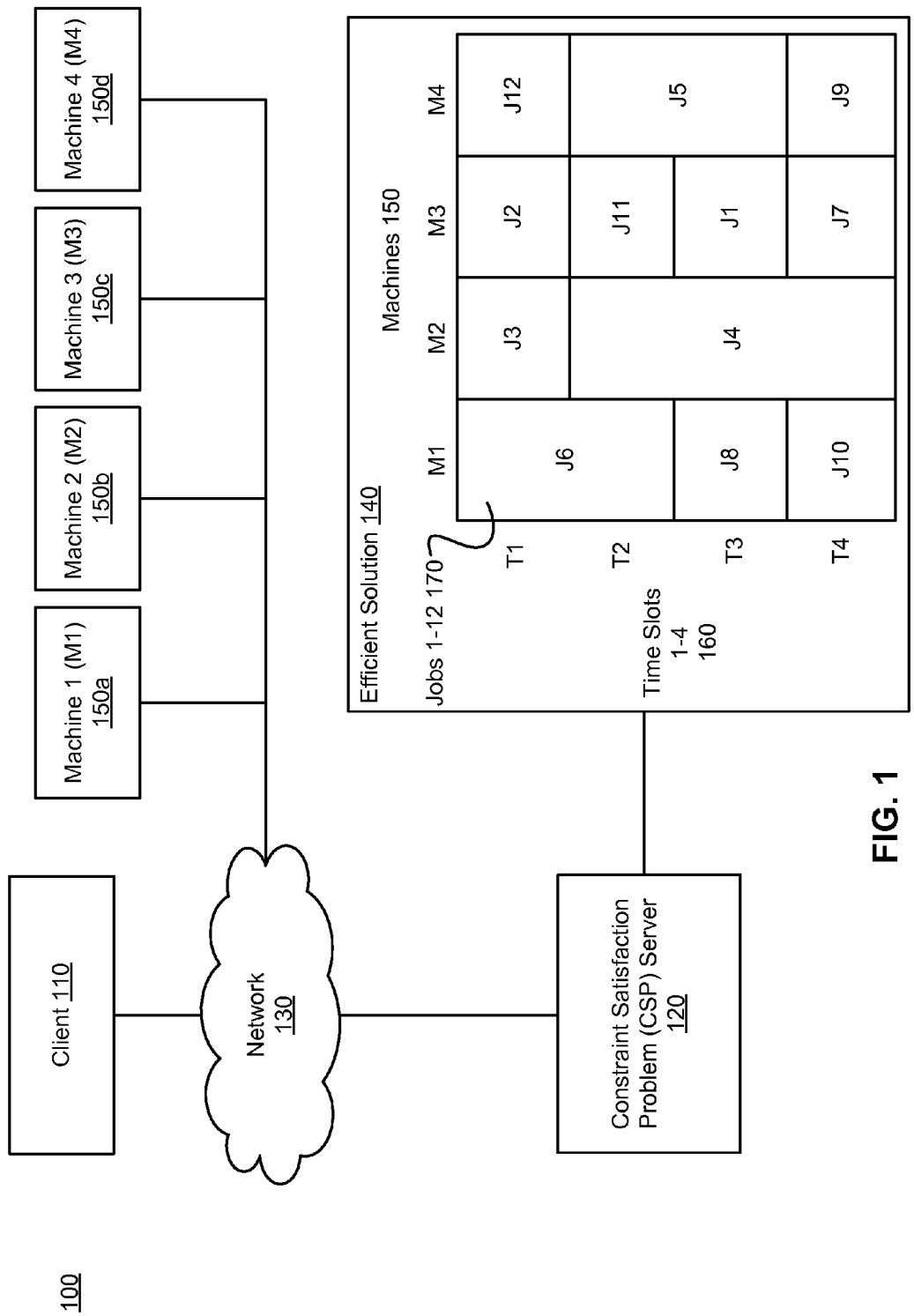
FIG. 1 is a block diagram of a computing environment for solving constraint satisfaction problems (CSPs) using NoGood generation based on search tree depth, according to one embodiment.

FIG. 1 is a block diagram of a computing environment for solving constraint satisfaction problems (CSPs) using NoGood generation based on search tree depth, according to one embodiment. As shown, the computing environment 100 includes a client 110 and a CSP server 120 connected through a network 130. Only one of each entity is illustrated in order to simplify and clarify the present description. There can be other entities in the computing environment 100 as well.

The client 110 is configured to interact with the CSP server 120 in order to specify CSPs, find efficient solutions to CSPs, and view the solutions. The client 110 is an electronic device that is operated by a user. In one embodiment, the client 110 is a conventional computer system executing, for example, a Microsoft Windows-compatible OS, Apple OS X, and/or a Linux distribution. The client 110 may also be a mobile telephone executing, for example, a Google Android operating system (OS) or another device having computer functionality, such as a tablet computer, personal digital assistant (PDA), video game system, etc.

The user uses the client 110 to specify a particular CSP for which an efficient solution is sought. The client 110 may provide the user with tools with which the client may specify the CSP. For example, the client 110 may execute software providing a graphical user interface (GUI) with which the user may specify the CSP, indicate the criteria for declaring a solution as "efficient" and/or define other aspects of the CSP. The client 110 may then provide the specification of the CSP to the CSP server 120. In another embodiment, the client 110 may act as a conduit to the CSP server 120, and the tools for specifying the CSP may reside on the CSP server.

The CSP server 120 processes CSPs to find efficient solutions and reports the solutions to the user of the client 110. The user may then implement one or more of the solutions. In one embodiment, the CSP server 120 includes one or more computers. For example, the CSP server 120 may include a distributed computing system having many individual computers working together to process the CSPs. Depending upon the embodiment, the CSP server 120, client 110, and/or another computer system may be configured to implement a solution to the CSP found by the CSP server.

In some cases, supplemental information for a CSP description may be provided by the client 110 to the CSP server 120 after the CSP server 120 has already begun processing the received CSP. The CSP server 120 is configured to receive such supplemental information during processing, and to incorporate it into the description of the CSP. The supplemental information may be used to assist in the determination of efficient solutions to the CSP.

In one embodiment, the CSP server 120 formulates the CSP as a binary tree, and searches the binary tree to identify solutions. During the search, the CSP server 120 may stop the search, reconstruct the binary tree, and then restart the search on the reconstructed tree. An embodiment of the CSP server 120 determines when to restart the search based on a restart depth based in part on the deepest depth previously searched minus a restart value. When the CSP server 120 determines to restart a search, it generates a "NoGood" marker indicating a portion of the binary tree that has already been searched. When searching the reconstructed tree, the CSP server 120 uses the NoGood marker to identify portions of the tree that have already been searched for a solution and exclude those portions from additional searching. In this manner, the quality (i.e., efficiency) of the searching for the solution is improved because portions of the tree that have already been searched are not searched again in future iterations of the search. The CSP server 120 accordingly devotes its resources to searching portions of the tree that have not yet been searched. This technique for creating NoGood markers results in the creation of fewer NoGood markers over the course of the entire search compared to creation of NoGood markers based on the number of nodes of the binary tree searched. This technique also comparatively decreases the extent to which portions of the tree are re-searched in future iterations of the search, thereby increasing the efficiency of the search.

A discussion of CSPs in more detail is useful to explain the operation of the CSP server 120. As mentioned above, the CSP server 120 receives the specification of a CSP from a user in one embodiment. The specified CSP includes a number of different variables, states to which the variables may be assigned, and one or more constraints that restrict the states to which variables may be assigned. Each variable may be assigned to more than one possible state. A solution to the CSP is an assignment of variables to states that satisfies the constraints. A CSP may have one or more possible solutions, or it may not have any solution.

An assignment of a variable to a state in a specified CSP may have an associated cost. The total cost of a solution to the CSP is derived from the costs of the individual assignments of the variables to the states. For example, the total cost of the solution may be the sum of the costs of the individual assignments. Since different solutions to the CSP have different assignments of variables to states, the different solutions also have different costs. Some solutions may have costs that effectively render the solutions infeasible, while other solutions may have lower costs that render the solutions feasible. The user may specify as part of the CSP which solutions have costs that render the solutions feasible. These solutions are referred to herein as being "efficient." For example, an efficient solution may be a solution that has a cost below a threshold.

In one embodiment, the variables, states, constraints and costs of the CSP model one or more objects or activities in a real-world application domain. Similarly, solutions to the CSP (CSP solutions) model solutions to the real-world problem described by the CSP (real world solutions). Real world solutions may be undertaken in the real world using the objects or activities designated by the states of variables from the CSP solutions. In this specification, the term "solutions" refers to CSP solutions.

For example, the real-world application domain may be a scheduling project in which computer processing jobs are assigned to computers in a distributed computer system.

FIG. 1 illustrates this example application domain in more detail. In the figure, computer processing jobs 170 may be assigned to available time slots 160 on several computers 150. Here, the CSP variables include the possible time slots to which each job 170 may be assigned, the amount of time each job 170 takes to complete (e.g., a given job may take more than one time slot), and the computer 150 that will perform the job. The states of the CSP are the particular assignments of jobs 170 to time slots 160 and computers 150. The constraints of the CSP may include, for example, that every job 170 must be assigned a computer 150 and a time slot 160, that each job be assigned only once, and that some jobs 170 be completed before others.

FIG. 1 illustrates one possible solution 140 to the example CSP determined by the CSP server 120. In this solution 140, all states have been assigned, which is illustrated by the assignment of all twelve jobs 170 to computers 150 and time slots 160. In this example, costs associated with the solution may be, for example, capital costs such as the wear and tear on the computers 150, the time cost of implementing the solution to get through processing all of the jobs, power costs associated with running the machines, opportunity costs due to computers idling while waiting for jobs etc. The solution 140 may be used by the client 110 to assign the user's computer processing jobs 170 to machines 1-4 150a-d according to the time slots 160 designated by the solution 140.

Another example of a real-world application domain which may be formulated as a CSP is a construction project. In this example, the variables represent real-world entities such as a series of tasks and the workers who can perform the tasks. The constraints may include restrictions on the order that the tasks are performed. The solution is an ordered series of construction tasks. The costs, in turn may include the labor costs of the workers and material costs for the construction.

Still another example of a real-world application domain which may be formulated as a CSP is the assignment of crews to airline flights. In this case, the variables represent entities such as the airplanes, crews, airplane locations, and airplane routes. The constraints represent conditions such as each crew being assigned to only one flight and each flight leaving from an airport at which a flight previously arrived. The solution is an assignment of the crews to the flights, and the associated costs include aspects such as fuel costs and crew salaries.

Other examples of application domains in which solutions may be found using CSP formulations include aspects integrated circuit design, scheduling workers (e.g., assigning nurse shifts in a hospital), etc. As used herein, the phrase "real-world application domain" refers to an environment like one of the examples described above where the variables, states, constraints, and costs describe entities that have a physical presence and/or meaning in the real world. The solution to the CSP problem output by the CSP server 120 likewise represents an assignment of variables to states that may be implemented in the physical world to solve the problem modeled by the CSP.

The network 130 illustrated in FIG. 1 uses standard communications technologies and/or protocols to facilitate data transmission among the computer networks. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
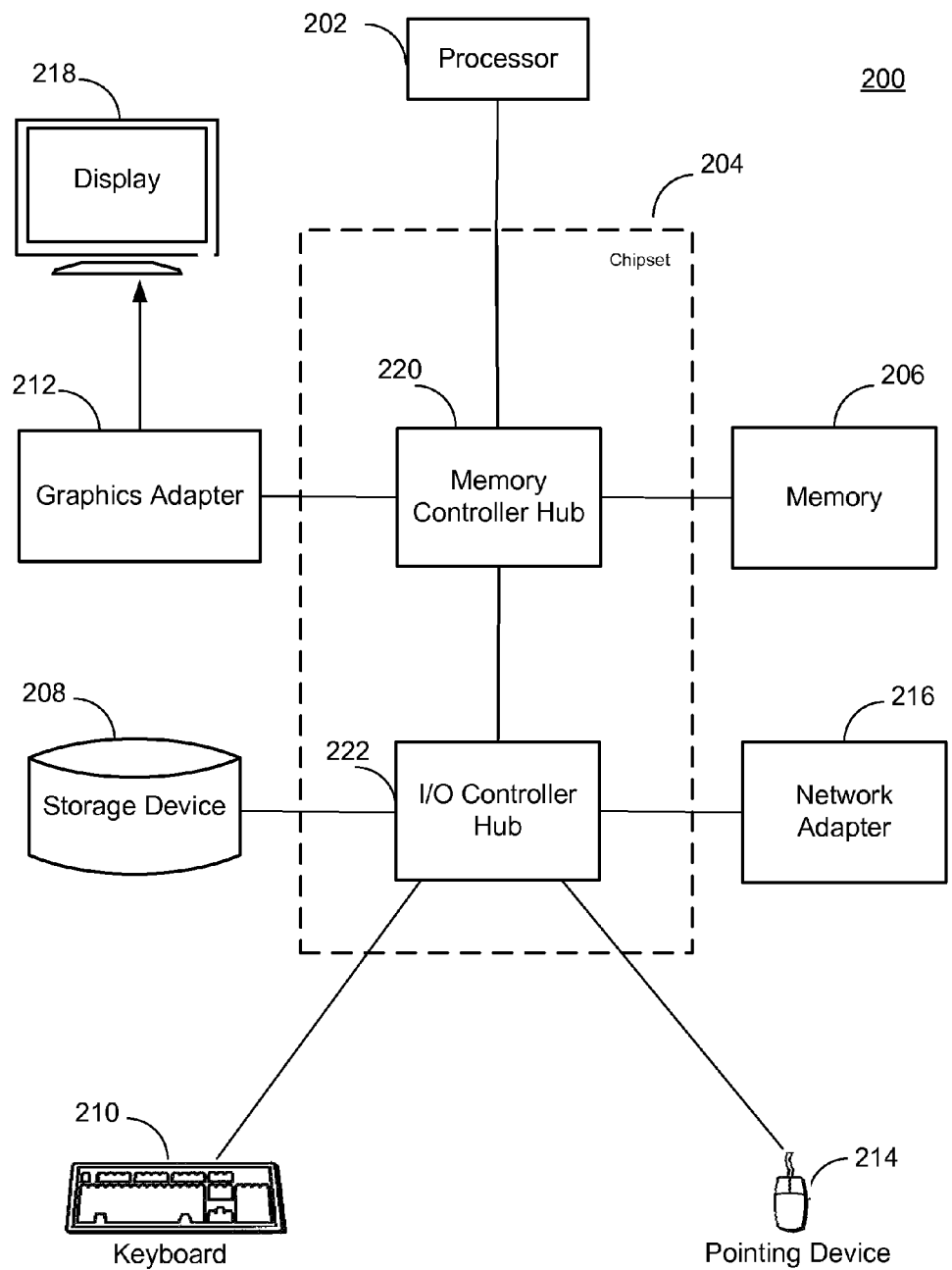
FIG. 2 is a high-level block diagram illustrating a computer for serving as a client or a CSP server.

FIG. 2 is a high-level block diagram illustrating a computer 200 for serving as a client 110 or a CSP server 120. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks 130.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers used by the entities of FIG. 1 can vary depending upon the embodiment and the processing power required by the entity. For example, the CSP server 120 might comprise multiple blade servers working together to provide the functionality described herein. As another example, the client 110 may comprise a smartphone with limited processing power. The computer 200 can lack some of the components described above, such as keyboards 210, graphics adapters 212, and displays 218.

Figure 3:
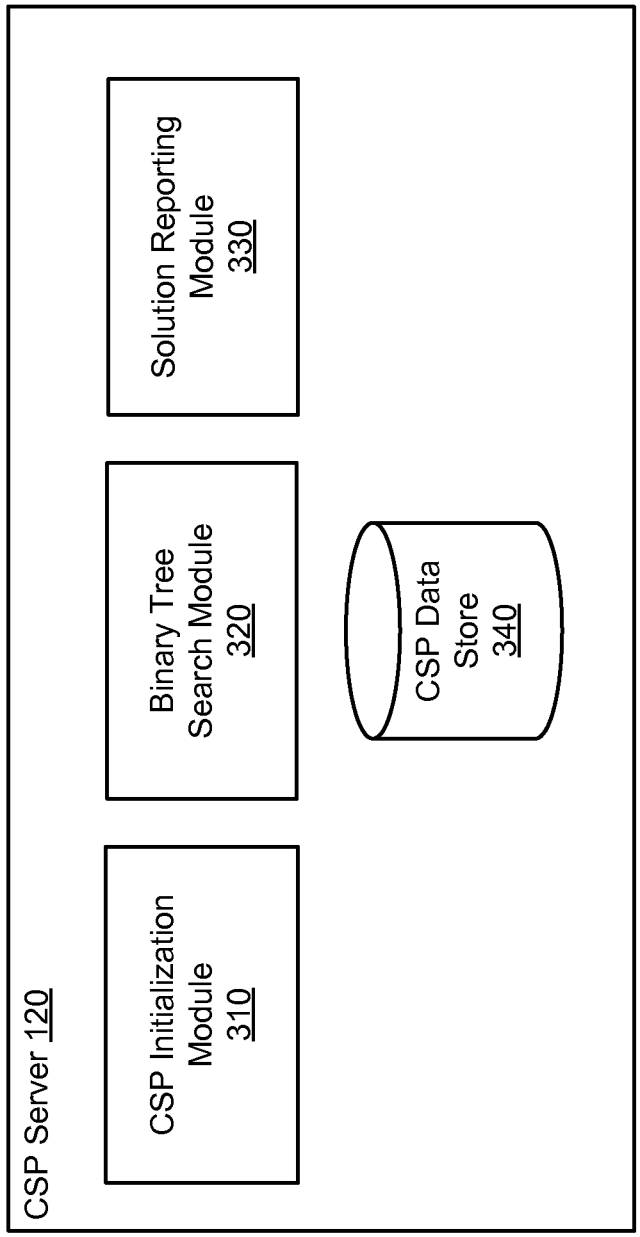
FIG. 3 is a block diagram illustrating modules within the CSP server, according to one embodiment.

FIG. 3 is a block diagram illustrating modules within the CSP server 120, according to one embodiment. The CSP server 120 includes a CSP initialization module 310, a binary tree search module 320, a solution reporting module 330, and a CSP data store 340. The CSP initialization module 310 is configured initialize CSPs. Initializing a CSP includes at least one of receiving previously created specifications for a CSP and defining (or specifying or creating) new a CSP. Initializing a CSP also includes building a binary tree that represents a CSP.

As discussed above, in one embodiment the CSP initialization module 310 receives a CSP specification from the client 110. The CSP specification may be received as a CSP digital file. The CSP digital file includes all of the necessary information for describing the CSP including, for example, states, variables, constraints, costs, and qualifications for what qualifies as an efficient solution.

In one embodiment, the CSP digital file is stored using an extensible, compact, binary file format. The file format allows for the exchange of CSPs between entities, for example an entity that needs a CSP solved (e.g., the user of the client 110), and the entity who will solve the CSP (e.g., the CSP server 120). The file format allows for convenient storage of the CSP. Further, the file format allows the CSP to be easily recognized by a wide range of CSP-solving software or hardware applications. In one embodiment, the file format may be varied to be represented in an XML format. In another embodiment, the file format may be a text file. The file format may be parsed by a parser configured to interpret the file format.

The file format defines a number of expressions each including one or more arguments. Each expression may represent a constraint, variable, or qualification for an efficient solution. Expressions may include an index argument that is unique among all expressions, in order to uniquely identify each expression. Each efficient solution qualification expression includes arguments specifying the conditions necessary for a solution to be eligible as an efficient solution. The expression may also include arguments listing the variables or costs relevant to the determination of the whether or not a solution is efficient.

Each constraint expression has a type argument, indicating the type of operation performed by the constraint. For example, the constraint may be a difference type constraint indicating a limit on the difference between two possible states of two different variables. The constraint also includes other arguments for testing and validating the constraint during a search. Continuing with the difference constraint example, if the constraint is that variable A minus variable B be less than 2, then the other arguments of the constraint would specify the variables relevant to the constraint, in this case A and B, the operation of subtraction, and the permitted outcomes of the constraint, in this case a value of less than two.

Each variable expression may have an argument identifying the type of the variable. For example, if variable X is an integer, a type argument may specify it as an integer. The variable expression may also have arguments identifying the possible states of the variable. For example, if the variable X may have a state that is a value between 1 and 126, then the argument may indicate the minimum and maximum values of the variable.

Alternatively, the CSP initialization module 310 may receive inputs from the client 110 so that a user of the client 110 may create a CSP. The CSP initialization module 310 receives input from the client 110 regarding the variables, states, costs, constraints, and efficient solution qualifications that will make up the specification of the CSP. The CSP initialization module 310 compiles the received input and creates the CSP. In one embodiment, the created CSP is stored as a digital CSP file using the file format described above.

The CSP initialization module 310 stores received or created specifications for CSPs in a CSP data store 340. The CSP data store 340 may include a database and/or a file system. In the event supplemental information is received while the CSP is being processed, the supplemental information may be added to the digital CSP file containing the description of the CSP.

The CSP initialization module 310 is further configured to construct a binary tree representing the CSP. The binary tree is a set of linked nodes, where each node has at most two child nodes and only a single parent node. Each node in the tree represents a decision regarding the assignment of each of one or more of the variables of the CSP to a state. The node structure obeys the constraints imposed by the CSP, such that no variable may take a state that contradicts a constraint. Based on the constraints imposed on the CSP and the number of available states for each variable, some nodes will have no children as all variables in the CSP will have been assigned to states. These leaf nodes represent solutions to the CSP. A cost can be determined for each solution based on the assigned states of each variable. The CSP data store 340 is configured to store the binary tree representing the CSP.

The binary tree has a height that is a distance, in terms of a number of nodes, between the root node at the top of the binary tree to the leaf nodes at the bottom of the binary tree. The height, however, may vary between different leaf nodes, based on the number of available states for each variable. Thus, a binary tree may have as many heights as it does leaf nodes. Any given node has a depth determined by the distance, in terms of number of nodes, between itself and the root node.

The binary tree search module 320 searches the binary tree to determine one or more efficient solutions for the CSP. The search module 320 searches a binary tree using depth first searching. In depth first searching, the search module 320 iteratively searches a binary tree starting from the root node and progressing from each parent node to its child nodes. Each time the search module 320 traverses from a parent node to a child node, one or more variables are assigned to states. The search module 320 keeps track of the assignment of variables to states as it progresses to each node. When the search module 320 arrives at a leaf node, the search module records the solution and the cost of the solution in the CSP data store 340. Along with each solution, the search module 320 stores in the CSP data store 340 the assignments of variables to states that make up the solution.

The solutions stored in the CSP data store 340 may also include information designating them as efficient solutions. The search module 320 is configured to mark a stored solution as an efficient solution if the cost of the solution meets the qualifications specified by the CSP specification. In one embodiment, only efficient solutions are stored in the CSP data store 340.

After reaching a leaf node, the search module 320 continues searching by backing up to the previous parent node above the leaf node, and searching the other child node of the parent node. This child node may or may not be a leaf node. If the child node is not a leaf node, the search continues down the binary tree from parent to child as before, until the search module 320 reaches another leaf node. If the next child node is a leaf node, the search module 320 records in the CSP data store 340 the solution, cost, and assignments of variables to states. This process continues, such that each time the search module 320 reaches a leaf node, the search module steps backwards up the binary tree until it finds a child node it has not yet explored. The search module then continues searching down the tree starting at the unexplored child node.

The search module 320 is configured to periodically stop the search of the binary tree while the search is in progress and begin a new iteration of the search. The search module 320 restarts the search when backtracking up the binary tree to the point where the search depth is less than a restart depth. In one embodiment, the restart depth is determined based on the deepest depth previously searched within the binary tree minus a restart value. In another embodiment, the restart depth is determined based on the current size of the binary tree. The current size of the binary tree may be determined based on the product of all possible states of all variables in the CSP.

If the restart depth is determined based on the deepest depth previously searched minus the restart value, the restart value may be user specified, predetermined, or determined dynamically. For example, if the binary tree is known to have a height of 20 such that the leaf nodes are at depth 20, and if the restart value is 5, the restart depth is 15.

The deepest depth previously searched, and consequently the restart depth, are determined during the search of the binary tree by the search module 320. In one embodiment, the search module 320 searches the binary tree until it reaches a leaf node. The search module then records, in the CSP data store 340, the depth of the leaf node. The leaf node depth serves at least as an initial deepest depth previously searched. As the search module 320 begins backtracking up the binary tree to find an unexplored child node, a counter is increased. The counter increased by one each time the search module 320 backtracks up the binary tree from a child node to a parent node above the depth of the leaf node that started the counter.

If the search module 320 finds an unexplored child node and begins searching the nodes beneath the unexplored child node, the search module 320 may end up searching child nodes at depths greater than the initial deepest depth previously searched. For example, the binary tree may contain leaf nodes with depths greater than the initial deepest depth previously searched. If another leaf node is discovered with a depth greater than the initial deepest depth previously searched, the search module 320 may continue searching differently depending upon the implementation In one embodiment, the deepest depth previously searched is updated to the depth of the new, deeper leaf node. The counter is also restarted. In another embodiment, the deepest depth previously is not updated from its initial value, and the counter only resumes increasing when above the search module 320 is backtracking to find unsearched child nodes above the initial deepest depth previously searched.

The search is restarted when the counter meets or exceeds the restart value. Another way to state this is that the search is restarted when the current depth of the search by the search module 320 is less than the restart depth, where the restart depth is the deepest depth previously searched minus the restart value.

Each time the search is restarted, the search module 320 may instruct the CSP initialization module 310 to reconstruct the binary tree. The binary tree may be reconstructed as a matter of course, or alternatively if the search module 320 receives an indication from the CSP initialization module 310 that it has received supplemental information for the description of the CSP. Supplemental information may include, for example, the addition of variables, states, and/or constraints to the CSP, or alternatively the removal of variables, states, or constraints from the CSP. The supplemental information may also modify the costs of states for variables, and change the conditions for what qualifies as an efficient solution. The reconstruction of the binary tree incorporates any supplemental information that has been received.

When the search is restarted, the search module 320 is configured to generate a NoGood marker indicating a portion of the binary tree beneath the restart node that has already been searched during the current iteration of the search. The NoGood marker is stored in the CSP data store 340. The NoGood marker designates that the marked portion of the binary tree does not need to be searched after the restart of the search during subsequent iterations of the search because this portion of the tree has already been searched (i.e., the portion of the binary tree is "no good" for future searching). Re-searching this portion of this tree would not only be duplicative, but also a waste of searching time that is better spent on other portions of the tree that have not yet been searched.

A NoGood marker includes the assignments of variables to states that define the restart node. Described differently, the NoGood marker includes all of the assignments of variables to states between the root node and the restart node in the binary tree. A NoGood marker may also include one or more constraints relevant to the variables that have been assigned states in the restart node. As a consequence even if the binary tree is different in future search iterations due to reconstruction, the NoGood marker is still applicable to the reconstructed version of the tree. A NoGood marker may also include information such as the depth of the restart node, the decision to be made in the restart node, the parent of the restart node, and the children of the restart node.

After establishing a NoGood marker and during subsequent iterations of the search, the search module 320 skips searching all nodes that match the variable to state assignments of any NoGood markers stored in the CSP data store 340. Thus, the search module 320 skips searching all restart nodes from previous iterations of the search, as well as all child nodes of the restart nodes. Even if the binary tree has changed due to the receipt of supplemental information for the CSP, the variable to state assignment information stored in the CSP data store 340 allow the search module 320 to skip the appropriate nodes despite the change in binary tree structure.

The larger the restart value, the closer to the root node NoGood markers will be created. As a consequence, each NoGood marker will include comparatively more child nodes. During new iterations of the search, each iteration of the search will re-search comparatively fewer nodes before encountering a NoGood marker.

Further, as the restart value increases and each NoGood marker includes comparatively more child nodes, fewer NoGood markers will be created in total over the course of the entire search of the binary tree. This is because as the restart value increases, fewer NoGood markers are needed to designate the same number of child nodes as having already been searched. Consider an example binary tree wherein two child nodes of the same parent node each have a NoGood marker based on a given restart value. Increasing the restart value by one would mean that instead of two NoGood markers, one for each child, instead only a single NoGood marker would be created at the parent node instead. Generally, for each incremental increase in the restart value, the number of NoGood markers generated decreases by approximately half. This number may fluctuate however, based on the asymmetry of the binary tree, for example where the leaf nodes appear above the restart depth. By creating fewer NoGood markers, less computer memory is needed to store the NoGood markers.

Restarting the search based on the deepest depth previously searched and the restart value will generally reduce the number of NoGood markers generated during the search relative to a case where search restarts and NoGood marker creation is based solely on the number of nodes searched before restart. In case where NoGood markers are created solely based on the number of nodes previously searched, generally NoGood markers will be created at many different depths within the binary tree. Generally, some of these NoGood markers will be created deeper in the binary tree than others. The deeper in the binary tree a NoGood marker is created, the fewer child nodes it will cover, and thus the less nodes it will prevent from being researched. Since in this case NoGood creation is based on the number of nodes searched, the more re-searching of previously searched nodes is performed, the more often NoGood markers will be created that are at least partially redundant with other NoGood markers created deeper in the tree. As a consequence, generally more NoGood markers will need to be created to completely search the binary tree as compared to a case where NoGood marker creation is based on the deepest depth previously searched and a restart value.

The restart value can be tuned to switch between creating fewer NoGood markers and having longer search iterations, or creating more NoGood markers and having shorter search iterations. As future iterations of the search will not need to re-search branches of the binary tree marked by NoGood markers, the closer to the root node the NoGood markers appear, the fewer nodes will need to be re-searched in future iterations of the search. This decreases the overall amount of time required to perform the search.

The solution reporting module 330 reports one or more efficient solutions identified by the search module 320 and stored in the CSP data store 340. The solution reporting module 330 may report the efficient solutions to the client 110. The solution reporting module 330 may also store the efficient solutions in a non-transitory storage medium. The solution reporting module 330 may additionally be configured to implement the efficient solutions in the real world, for example by programming the behavior of the computers 150 illustrated in FIG. 1.

Figure 6:
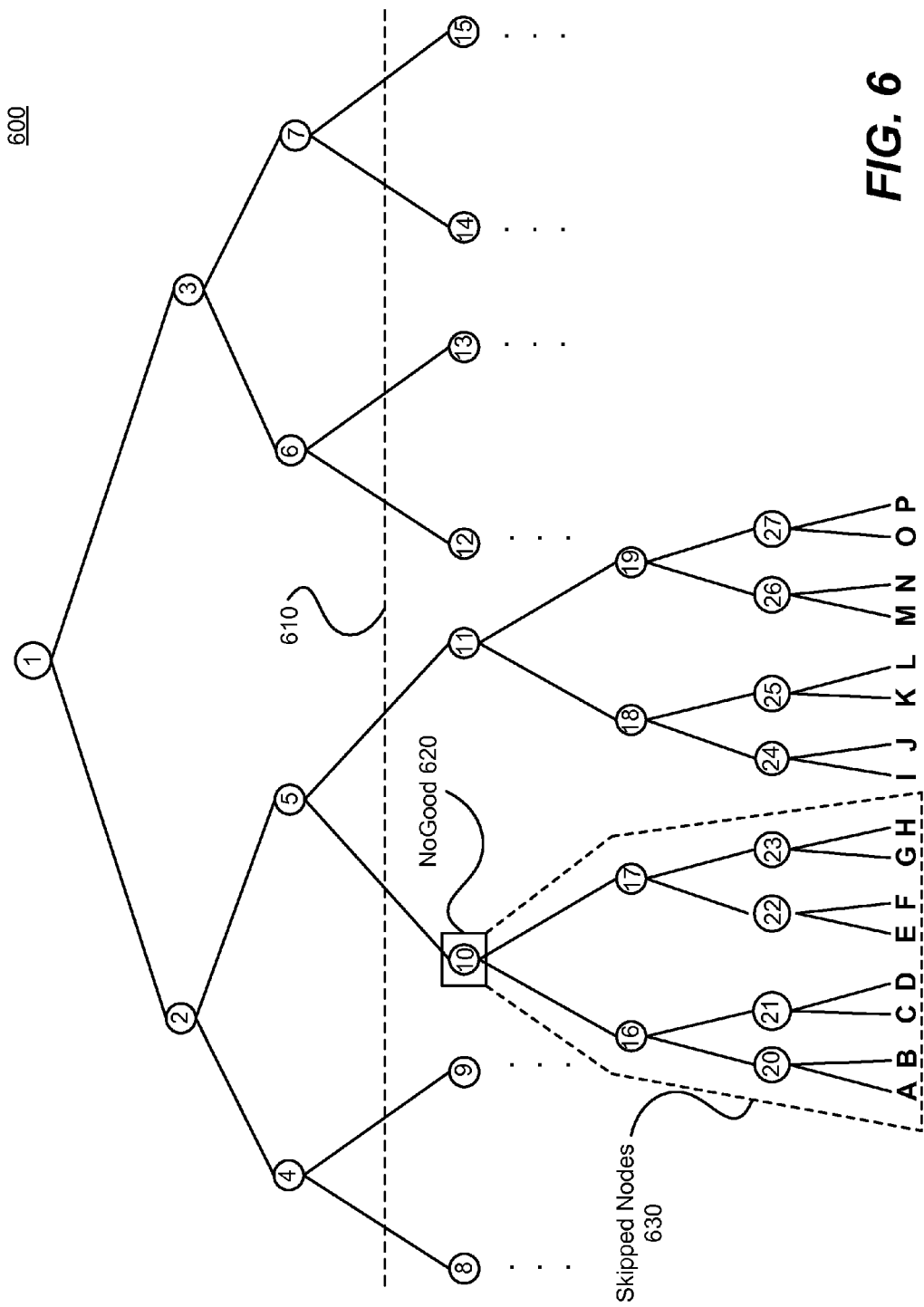
FIG. 6 is an illustration of an example binary tree with NoGoods markers assigned, according to one embodiment.

FIG. 6 is an illustration of an example binary tree 600 with NoGood markers assigned, according to one embodiment. In FIG. 6, not all nodes of binary tree 600 are illustrated, for clarity. The non-solution nodes of the binary tree are labeled 1 through 27. The root node is node 1. The leaf nodes, or solutions, are labeled A through P. In the CSP illustrated by binary tree 600, the depth of the deepest node previously searched is six nodes from the root node. Coincidentally, the height of the binary tree is also six nodes, though this is not necessarily the case in all binary trees. The restart value for establishing the restart depth is three nodes, and thus the restart depth is three nodes below from the root node. Dashed line 610 indicates the line above which the search depth is above the restart depth.

Node 10 illustrates a restart node where a search is restarted and a NoGood marker 620 is created. The NoGood marker 620 indicates to the search module 320 that node 10 and all of its children, here nodes 16, 17, and 20-23 and solutions A-H, have already been searched for a possible efficient solution. The scope of the nodes skipped is illustrated by dotted line 630.

Figure 4:
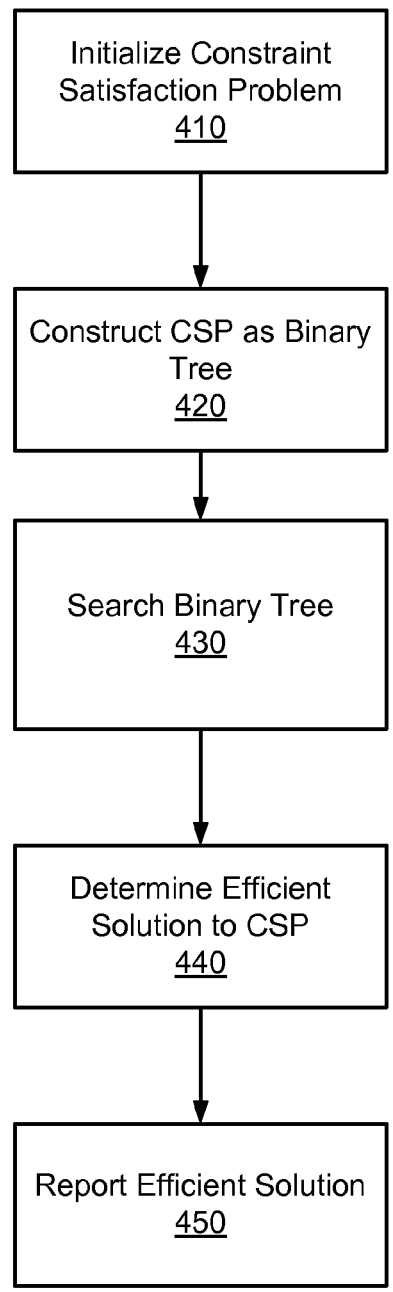
FIG. 4 is a flow diagram illustrating a process for determining efficient solutions to a CSP, according to one embodiment.

FIG. 4 is a flow diagram illustrating a process for determining efficient solutions to a CSP, according to one embodiment. A CSP is initialized 410 by the CSP server 120. Initialization of the CSP may entail receiving a previously generated specification of a CSP, or generating a CSP specification based on inputs received from a client. The CSP server 120 constructs 420 the CSP as a binary tree. The CSP server 120 searches 430 the binary tree representing the CSP. During the course of the search, the search may be restarted multiple times, and each time a search is restarted a NoGood marker may be added to mark variable to state assignments (e.g., nodes) that do not need to be searched on future iterations of the search. The CSP server 120 determines 440 one or more efficient solutions to the CSP and stores them in the CSP data store 240. The efficient solutions are then reported 450 out by the CSP server 120.

Figure 5:
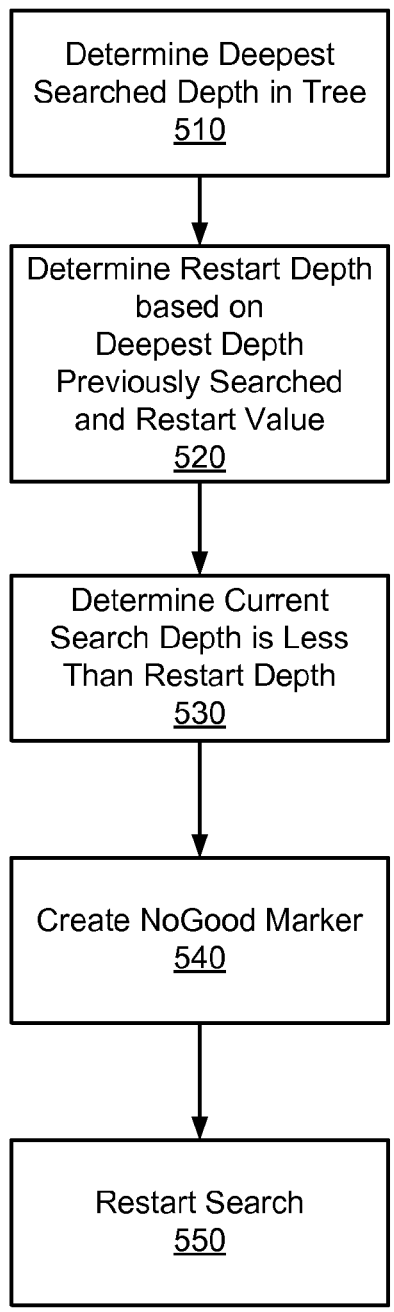
FIG. 5 is a flow diagram further illustrating the search of a binary tree as discussed in FIG. 3, according to one embodiment.

FIG. 5 is a flow diagram further illustrating the search of a binary tree as discussed in FIG. 3, according to one embodiment. During the search of the binary tree 430, the CSP server 120 determines 510 the deepest depth previously searched in the binary tree. As the search of the binary tree continues, the CSP server 120 monitors the search depth relative to a restart depth using a counter, and may also update the deepest depth searched. The search module determines 520 a restart depth for when to restart the search based on the deepest depth previously search minus the restart value. During the search of the binary tree, if the current search depth is less than the restart depth 530, then the CSP server 120 creates a NoGood marker 540 and restarts the search 550. If the current search depth is not greater than the restart depth, the search module 320 continues searching.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for finding efficient solutions to constraint satisfaction problems. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A system for determining an efficient solution to a constraint satisfaction problem (CSP), comprising:
a non-transitory computer-readable storage medium storing executable computer program instructions comprising instructions for:
initializing the CSP and constructing a binary tree using the CSP, the CSP modeling a real world problem in an application domain, the CSP comprising a plurality of variables, a plurality of states, and one or more constraints determining which states each variable is permitted to be assigned to in a CSP solution, the CSP solution modeling a real world solution to the real world problem;
iteratively searching the binary tree to determine an efficient solution to the CSP, the searching comprising starting a new iteration of the search of the binary tree when a search depth is less than a restart depth, the restart depth based on a deepest depth previously searched minus a restart value, wherein the search depth is the depth measured when backtracking up the binary tree after reaching a leaf node of the binary tree, and a new iteration of the search is a search that begins at the root node of the binary tree and reporting the efficient solution;

a processor for executing the computer program instructions.

2. The system of claim 1, further comprising instructions for:

creating a NoGood marker indicating a portion of the binary tree that is not to be searched in the new iteration of the search.

3. The system of claim 2, wherein the NoGood marker is created responsive to the search depth being less than the restart depth.

4. The system of claim 2, wherein the NoGood marker specifies assignments of each of one or more variables of the CSP to a state of the CSP for the variables and states that have already been searched during a current iteration of the search.

5. The system of claim 2, wherein the NoGood marker specifies assignments of each of one or more variables of the CSP to a state of the CSP for the assignments of variables and states between a root node and a restart node of the binary tree.

6. The system of claim 1, wherein the efficient solution comprises a cost below a threshold, the cost based on an assignment of all of the variables of the CSP to states.

7. The system of claim 1, wherein the instructions comprise receiving supplemental CSP information comprising at least one of a new variable for the CSP, a new state for a variable of the CSP, a new constraint for the CSP;

reconstructing the binary tree using the supplemental information to construct a reconstructed binary tree;

searching, during the new iteration of the search, the reconstructed binary tree.

8. The system of claim 7, further comprising instructions for:

creating a NoGood marker based on a portion of the binary tree already searched, the NoGood marker indicating a portion of the reconstructed binary tree that is not to be searched in the new iteration of the search.

9. The system of claim 1, wherein initializing the CSP comprises storing a description of the CSP in a binary file format.

10. A method for determining an efficient solution to a constraint satisfaction problem (CSP), comprising:

receiving a CSP input, the CSP input describing a real world problem in an application domain, the CSP input comprising a plurality of variables, a plurality of states, and one or more constraints determining which states each variable is permitted to be assigned to in a CSP solution, the CSP solution modeling a real world solution to the real world problem;

initializing the CSP using the CSP input, the initializing comprising constructing a binary tree using the CSP input;

searching, iteratively, the binary tree to determine an efficient solution to the CSP, the searching comprising starting a new iteration of the search of the binary tree when a search depth is less than a restart depth, the restart depth based on a deepest depth previously searched minus a restart value; and reporting the efficient solution.

11. The method of claim 10, wherein searching comprises creating a NoGood marker indicating a portion of the binary tree that is not to be searched in the new iteration of the search.

12. The method of claim 11, wherein the NoGood marker is created responsive to the search depth being less than the restart depth.

13. The method of claim 12, wherein creating the NoGood marker based on the search depth being less than the restart depth decreases a total number of NoGood markers used to complete the search of the binary tree.

14. The method of claim 11, wherein the NoGood marker specifies assignments of each of one or more variables of the CSP to a state of the CSP for the variables and states that have already been searched during a current iteration of the search.

15. The method of claim 11, wherein the NoGood marker specifies assignments of each of one or more variables of the CSP to a state of the CSP for the assignments of variables and states between a root node and a restart node of the binary tree.

16. The method of claim 10, wherein the efficient solution comprises a cost below a threshold, the cost based on an assignment of all of the variables of the CSP to states.

17. A non-transitory computer-readable medium storing executable computer program instructions for determining an efficient solution to a constraint satisfaction problem (CSP), the instructions executable to perform steps comprising:

receiving CSP input, the CSP input describing a real world problem in an application domain, the CSP input comprising a plurality of variables, a plurality of states, and one or more constraints determining which states each variable is permitted to be assigned to in a CSP solution, the CSP solution modeling a real world solution to the real world problem;

initializing the CSP using the CSP input, the initializing comprising constructing a binary tree using the CSP input;

searching, iteratively, the binary tree to determine an efficient solution to the CSP, the searching comprising starting a new iteration of the search of the binary tree when a search depth is less than a restart depth, the restart depth based on a deepest depth previously searched minus a restart value; and reporting the efficient solution.

18. The non-transitory computer-readable medium of claim 17, wherein searching comprises creating a NoGood marker indicating a portion of the binary tree that is not to be searched in the new iteration of the search.

19. The non-transitory computer-readable medium of claim 18, wherein the NoGood marker is created responsive to the search depth being less than the restart depth.

20. The non-transitory computer-readable medium of claim 19, wherein the NoGood marker specifies assignments of each of one or more variables of the CSP to a state of the CSP for the variables and states that have already been searched during a current iteration of the search.

21. The non-transitory computer-readable medium of claim 19, wherein the NoGood marker specifies assignments of each of one or more variables of the CSP to a state of the CSP for the assignments of variables and states between a root node and a restart node of the binary tree.

22. The non-transitory computer-readable medium of claim 18, wherein the efficient solution comprises a cost below a threshold, the cost based on an assignment of all of the variables of the CSP to states.

* * * * *